United States Patent
Faruque et al.

(10) Patent No.: US 10,308,213 B2
(45) Date of Patent: Jun. 4, 2019

(54) ADJUSTABLE HEADREST AND SEATBELT WEB GUIDE

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/704,373

(22) Filed: Sep. 14, 2017

(65) Prior Publication Data

US 2019/0077365 A1    Mar. 14, 2019

(51) Int. Cl.
| | |
|---|---|
| *B60R 22/20* | (2006.01) |
| *B60R 22/26* | (2006.01) |
| *B60N 2/815* | (2018.01) |
| *B60R 22/18* | (2006.01) |
| *B60N 2/80* | (2018.01) |

(52) U.S. Cl.
CPC .............. *B60R 22/20* (2013.01); *B60N 2/815* (2018.02); *B60R 22/26* (2013.01); *B60N 2002/899* (2018.02); *B60R 2022/1818* (2013.01)

(58) Field of Classification Search
CPC ................... B60R 22/20; B60R 22/26; B60R 2022/1818; B60N 2/815; B60N 2/809; B60N 2002/899
See application file for complete search history.

(56) References Cited

U.S. PATENT DOCUMENTS

| | | | | |
|---|---|---|---|---|
| 5,330,228 A | | 7/1994 | Krebs et al. | |
| 5,390,982 A | * | 2/1995 | Johnson .................. | B60R 22/20 297/410 |
| 5,658,048 A | * | 8/1997 | Nemoto ................. | B60N 2/682 297/410 |
| 5,979,991 A | * | 11/1999 | Lewandowski ......... | B60R 22/26 297/391 |
| 6,139,111 A | * | 10/2000 | Pywell .................. | B60N 2/0705 297/484 |
| 6,305,713 B1 | * | 10/2001 | Pywell ................. | B60N 2/2222 280/801.1 |

(Continued)

*Primary Examiner* — Philip F Gabler
(74) *Attorney, Agent, or Firm* — Vichit Chea; Price Heneveld LLP

(57) ABSTRACT

A seatback for a seating assembly of a vehicle comprising: a seat frame; an exterior surface at least partially covering the seat frame; an adjustable headrest operably connected to the seat frame having a raised position and a lowered position relative to the seat frame; and a seatbelt web guide, connected to the adjustable headrest beneath the exterior surface, having a raised and lowered position relative to the exterior surface adjacent the seatbelt web guide; wherein, moving the adjustable headrest from the lowered position to the raised position causes the seatbelt web guide to move from the lowered position to the raised position. The adjustable headrest can include a support element operably connecting the adjustable headrest to the seat frame, the support element at least partially disposed beneath the exterior surface. The seatbelt web guide is operably connected to the support element of the adjustable headrest beneath the exterior surface.

20 Claims, 8 Drawing Sheets

(56) References Cited

U.S. PATENT DOCUMENTS

| | | | |
|---|---|---|---|
| 6,811,186 B1* | 11/2004 | Fraley | B60N 2/688 |
| | | | 280/801.2 |
| 7,635,048 B2 | 12/2009 | Copley et al. | |
| 9,004,606 B2 | 4/2015 | Bostrom et al. | |
| 9,254,767 B1 | 2/2016 | Tuman, II et al. | |
| 2002/0171233 A1 | 11/2002 | Grace | |
| 2018/0126947 A1* | 5/2018 | Barbat | B60N 2/806 |
| 2018/0236967 A1* | 8/2018 | Jaradi | B60N 2/809 |

* cited by examiner

ADJUSTABLE HEADREST AND SEATBELT WEB GUIDE

FIELD OF THE INVENTION

The present invention generally relates to an adjustable seatbelt web guide that guides seatbelt webbing over an occupant of a seating assembly in a vehicle.

BACKGROUND OF THE INVENTION

A vehicle typically has one or more seating assemblies including a seatback with an adjustable headrest and seatbelt webbing configured to secure an occupant of the seating assembly within the seating assembly. The seatback sometimes includes a seatbelt web guide to guide the seatbelt webbing properly over the occupant.

SUMMARY OF THE INVENTION

According to one aspect of the present invention, a seatback for a seating assembly of a vehicle comprises: a seat frame; an exterior surface at least partially covering the seat frame; an adjustable headrest operably connected to the seat frame having a raised position and a lowered position relative to the seat frame; and a seatbelt web guide, connected to the adjustable headrest beneath the exterior surface, having a raised and lowered position relative to the exterior surface adjacent the seatbelt web guide; wherein, moving the adjustable headrest from the lowered position to the raised position causes the seatbelt web guide to move from the lowered position to the raised position.

Embodiments of the first aspect of the invention can include any one or a combination of the following features:
  the adjustable headrest further includes a support element operably connecting the adjustable headrest to the seat frame, the support element at least partially disposed beneath the exterior surface;
  the seatbelt web guide is operably connected to the support element of the adjustable headrest beneath the exterior surface;
  the seatbelt web guide further including a seat belt webbing contact portion disposed above the exterior surface and an extended portion, at least partially disposed beneath the exterior surface, attached to the seat belt webbing contact portion;
  the extended portion of the seatbelt web guide is operably connected to the support element of the adjustable headrest beneath the exterior surface;
  a connector bracket disposed beneath the exterior surface operably connecting the extended portion of the seatbelt web guide to the support element of the adjustable headrest;
  a support bracket attached to the seat frame, the support bracket supporting the seatbelt web guide;
  the support bracket is disposed closer to the seat belt webbing contact portion than the connector bracket;
  a release mechanism releasably connecting the connector bracket to the support element of the adjustable headrest;
  the release mechanism comprises a connected state wherein the release mechanism operably connects the support element to the connector bracket, a released state wherein the support element is not operably connected to the connector bracket, and a manipulable latch portion disposed above the exterior surface configured to permit an occupant of the seating assembly to manipulate the release mechanism to be in either the connected state or the released state;
  the release mechanism further comprises a connector connected to the manipulable latch portion, the connector at least partially disposed beneath the exterior surface, a rotational spring including a base attached to the support element of the adjustable headrest, a first arm extending from the base and forming the operable connection with the connector, and a second arm extending from the base, wherein, using the manipulable latch portion to manipulate the release mechanism to the released state causes the first arm of the rotational spring not to be operably connected to the connector bracket and moving the adjustable headrest from the lowered position to the raised position does not cause the seatbelt web guide to move from the lowered position to the raised position;
  the rotational spring is spring-biased to cause the first arm of the rotational spring to be operably connected with the connector bracket if the adjustable headrest is in the lowered position and the manipulable latch portion is not causing the release mechanism to be in the released state;
  if the adjustable headrest is in the raised position and the seatbelt web guide is in the lowered position, and if the manipulable latch portion is not manipulating the release mechanism to the released state, then moving the adjustable headrest to the lowered position causes the first arm to operably connect to the connector bracket; and
  subsequently moving the adjustable headrest to the raised position from the lowered position causes the seatbelt web guide also to move to the raised position.

According to a second aspect of the present invention, a vehicle comprises: a seatbelt webbing; and a seating assembly including a seatback comprising a seat frame, an exterior surface at least partially covering the seat frame, an adjustable headrest operably connected to the seat frame having a raised position and a lowered position relative to the seat frame, and a seatbelt web guide guiding the seatbelt webbing, the seatbelt web guide, connected to the headrest beneath the exterior surface, having a raised position and a lowered position relative to the exterior surface adjacent the seatbelt web guide, wherein, moving the adjustable headrest from the lowered position to the raised position causes the seatbelt web guide to move from the lowered position to the raised position, and wherein, moving the adjustable headrest from the lowered position to the raised position causes the seatbelt webbing to move from a lowered position to a raised position.

Embodiments of the second aspect of the invention can include any one or a combination of the following features:
  the adjustable headrest further including a support element operably connecting the adjustable headrest to the seat frame, the support element at least partially disposed beneath the exterior surface;
  the seatbelt web guide is operably connected to the support element of the adjustable headrest beneath the exterior surface;
  the seatbelt web guide guides the seatbelt webbing above the exterior surface;
  the seatbelt web guide further including a seat belt webbing contact portion disposed above the exterior surface and an extended portion, at least partially disposed beneath the exterior surface, extending from the seat belt webbing contact portion;

the extended portion of the seatbelt web guide is operably connected to the support element of the adjustable headrest beneath the exterior surface;

the seat belt webbing contact portion contacts the seat belt webbing;

a connector bracket disposed beneath the exterior surface operably connecting the extended portion of the seatbelt web guide to the support element of the adjustable headrest;

a support bracket attached to the seat frame, the support bracket supporting the seatbelt web guide;

the support bracket is disposed closer to the seatbelt webbing contact portion than to the connector bracket;

a release mechanism releasably connecting the connector bracket to the support element of the adjustable headrest, the release mechanism comprising a connected state wherein the release mechanism operably connects the support element to the connector bracket, a released state wherein the support element is not operably connected to the connector bracket, and a manipulable latch portion disposed above the exterior surface configured to permit an occupant of the seating assembly to manipulate the release mechanism to be in either the connected state or the released state;

a connector connected to the manipulable latch portion, the connector at least partially disposed beneath the exterior surface;

a rotational spring including a base attached to the support element of the adjustable headrest, a first arm extending from the base and forming the operable connection with the connector, and a second arm extending from the base;

using the manipulable latch portion to manipulate the release mechanism to the released state causes the first arm of the rotational spring not to be operably connected to the connector bracket and moving the adjustable headrest from the lowered position to the raised position does not cause the seatbelt web guide to move from the lowered position to the raised position or the seatbelt webbing to move from the lowered position to the raised position;

the rotational spring is spring-biased to cause the first arm of the rotational spring to be operably connected with the connector bracket if the adjustable headrest is in the lowered position and the manipulable latch portion is not causing the release mechanism to be in the released state;

if the adjustable headrest is in the raised position and the seatbelt web guide is in the lowered position, and if the manipulable latch portion is not manipulating the release mechanism to the released state, then moving the adjustable headrest to the lowered position causes the first arm to operably connect to the connector bracket; and subsequently moving the adjustable headrest to the raised position from the lowered position causes the seatbelt web guide also to move to the raised position, and the seatbelt webbing also to move to the raised position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, the terms "rearward," "forward," "below," "upward," "downward," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
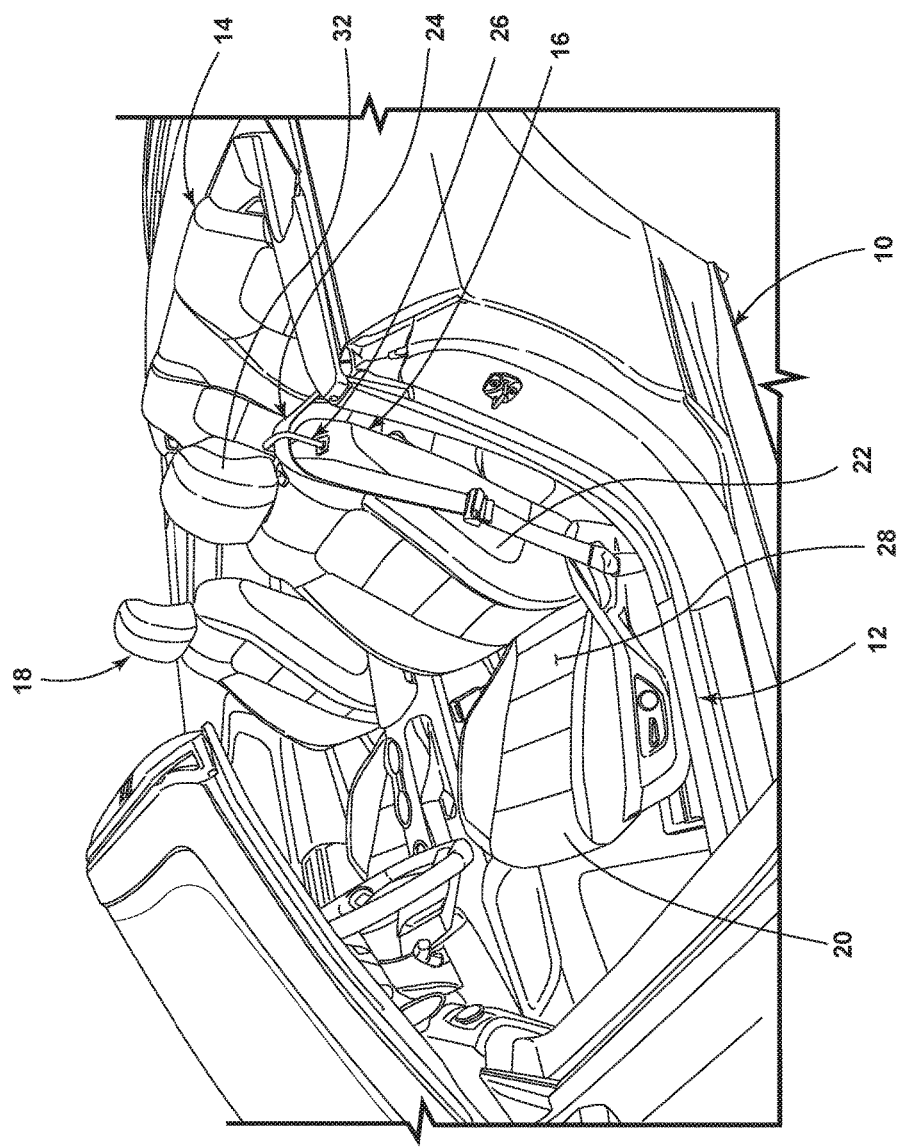
FIG. 1 is a perspective view of a vehicle, illustrating seatbelt webbing and a first seating assembly with a seatbelt web guide guiding the seatbelt webbing over a seatback.

Referring now to FIG. 1, a vehicle 10 includes a first row of seating 12 and typically a second row of seating 14 located rearward of the first row of seating 12. Larger vehicles (not illustrated) may include additional rows of seating rearward of the second row of seating 14. The first row of seating 12 includes a first seating assembly 16, in which an operator (not illustrated) of the vehicle 10 can sit, and a second seating assembly 18 located adjacent the first seating assembly 16, in which a passenger (not illustrated)

of the vehicle 10 can sit. The first seating assembly 16, for purposes of this disclosure, is identical to the second seating assembly 18 and thus only the first seating assembly 16 will be particularly described herein. The first seating assembly 16 includes a seat 20 and seatback 22, typically in pivotal relation to the seat 20. The vehicle 10 further includes seatbelt webbing 24, configured to protect the occupant of the first seating assembly 16. The first seating assembly 16 further includes a seatbelt web guide 26 guiding the seatbelt webbing 24 over the seatback 22. The first seating assembly 16 further includes an exterior surface 28, such as that provided by trim (e.g., fabric), which is the surface that contacts the occupant of the first seating assembly 16.

Figure 2:
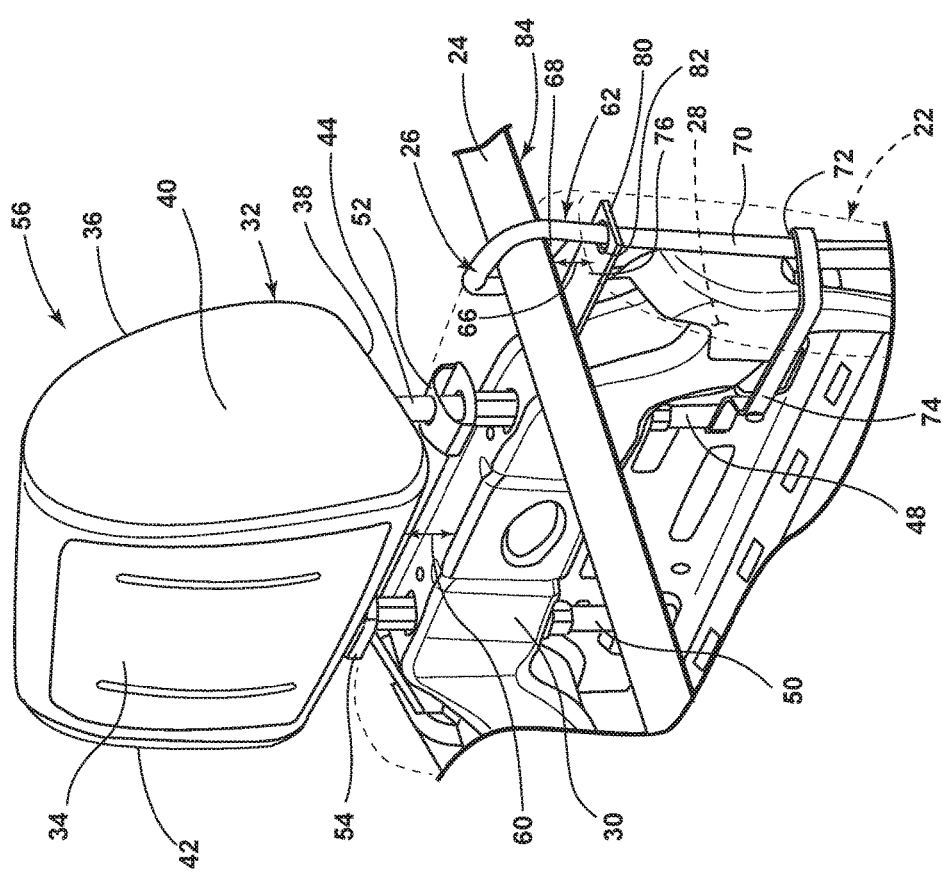
FIG. 2 is a perspective view of the seatback of FIG. 1, illustrating an exterior surface of the seatback in phantom, an adjustable headrest in a lowered position relative to a seat frame, and the seatbelt web guide and seatbelt webbing in lowered positions.
Figure 3:
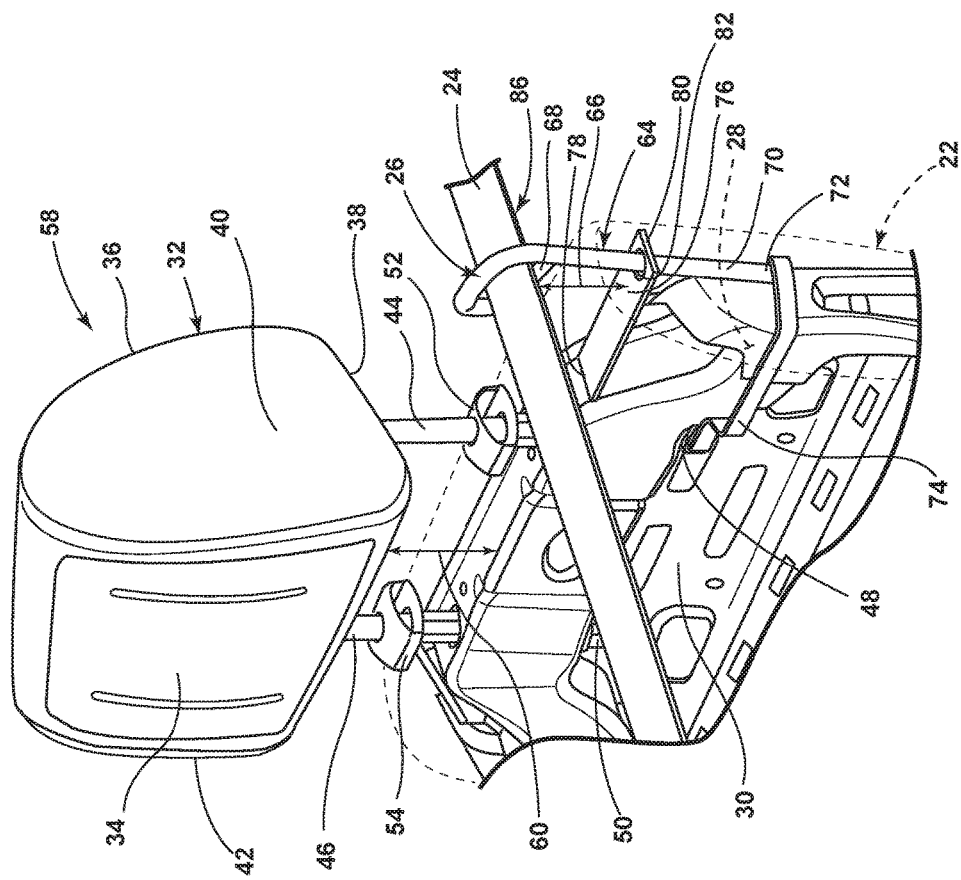
FIG. 3 is a perspective view of the seatback of FIG. 1, illustrating the adjustable headrest, the seatbelt web guide, and seatbelt webbing all in raised positions, a connector bracket operably connecting the adjustable headrest and the seatbelt web guide below the exterior surface.
Figure 4:
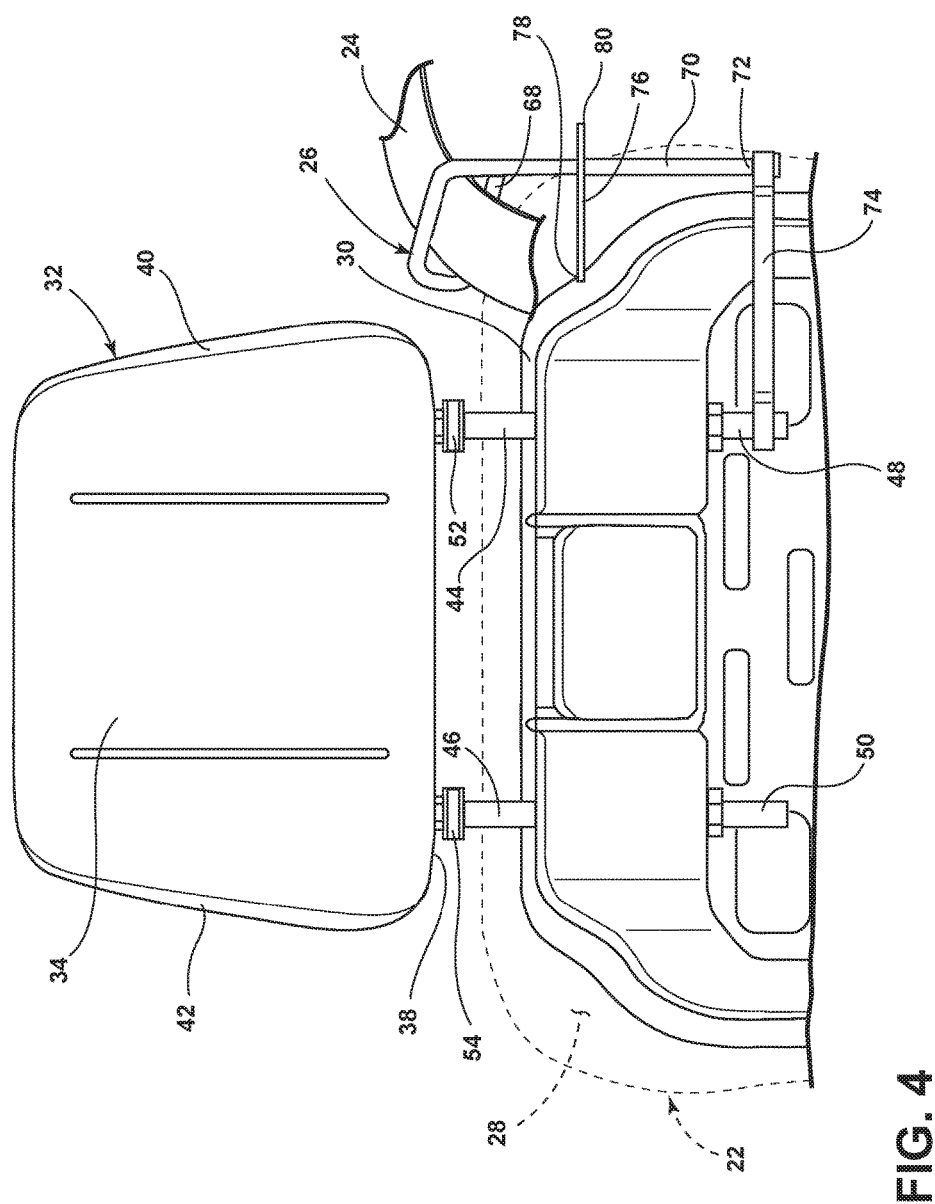
FIG. 4 is a front view of the seatback of FIG. 1, illustrating the adjustable headrest, the seatbelt web guide, and the seatbelt webbing all in lowered positions, the connector bracket operably connecting the adjustable headrest and the seatbelt web guide.
Figure 5:
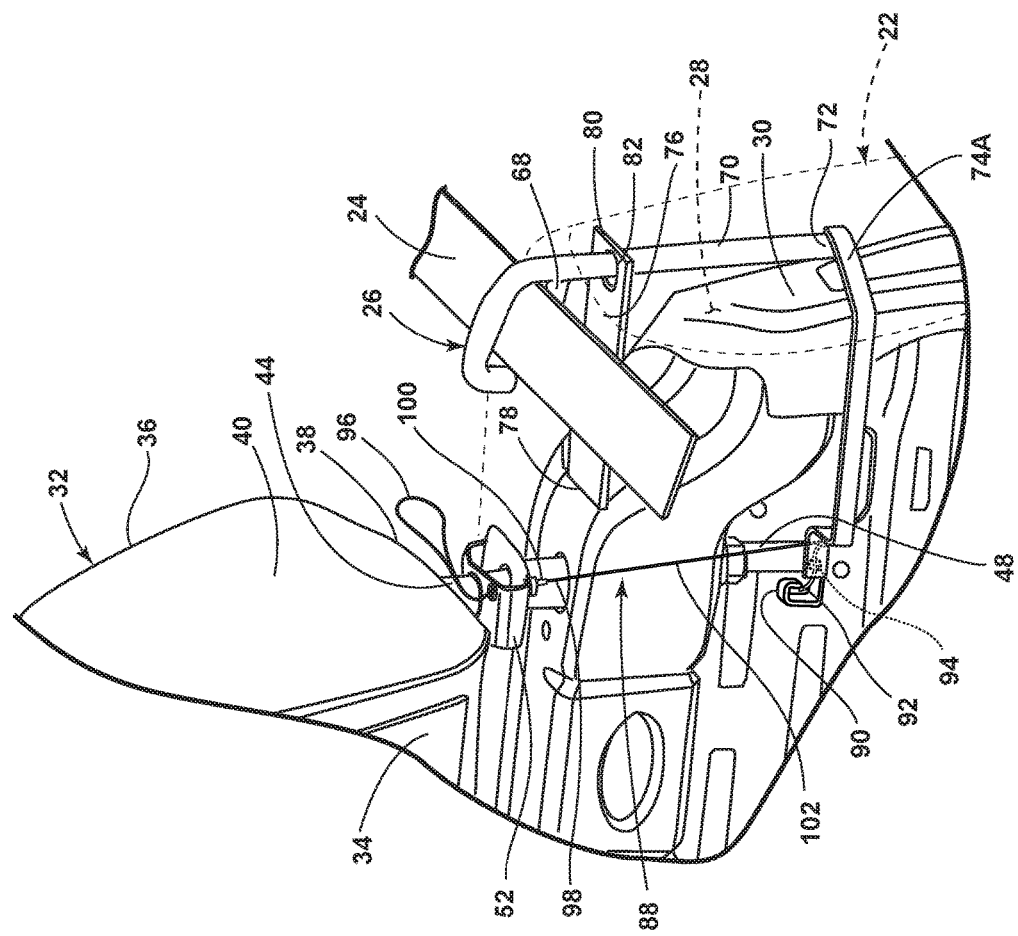
FIG. 5 is a perspective view of the seatback of FIG. 1, but illustrating an optional release mechanism and alternative connector bracket to provide a releasable operable connection between the adjustable headrest and the seatbelt web guide.

Referring now to FIGS. 2-4, the seatback 22 includes a seat frame 30, which provides structural support for the seatback 22. The exterior surface 28 at least partially covers the seat frame 30. The seatback 22 further includes an adjustable headrest 32, which includes a front 34, a rear 36 on the opposite side as the front 34, a bottom 38, a first side 40, and a second side 42, on the opposite side as the first side 40. The bottom 38 is the portion of the adjustable headrest 32 closest to the seat frame 30. The front 34 faces forward, while the rear 36 faces rearward.

The adjustable headrest 32 is operably connected to the seat frame 30. In the illustrated embodiment, the adjustable headrest 32 includes a first support element 44 and a second support element 46 operably connecting the adjustable headrest 32 to the seat frame 30. The first support element 44 and the second support element 46 can be metal rods, as known in the art. The first support element 44 and the second support element 46 extend from the bottom 38 of the adjustable headrest 32, into the seatback 22 beneath the exterior surface 28, and operably connect to the seat frame 30. The first support element 44 and the second support element 46 are at least partially disposed beneath the exterior surface 28 of the seatback 22. For example, both the first support element 44 and the second support element 46 include an end portion 48, 50, respectively, which are disposed beneath the exterior surface 28. The first support element 44 and the second support element 46 both extend through a retainer 52, 54, respectively, which may be disposed over the exterior surface 28 of the seatback 22. One or both of the retainers 52, 54 may include a brake mechanism (not illustrated), allowing for the adjustment of the adjustable headrest 32. The first support element 44 and the second support element 46 may be two portions of one contiguous piece (not illustrated) that extends through the interior of the adjustable headrest 32.

The adjustable headrest 32 has a lowered position 56 (see FIG. 2) and a raised position 58 (see FIG. 3), and can be adjusted from, between, and to the lowered position 56 and the raised position 58. The lowered position 56 and the raised position 58 can be positions relative to the seat frame 30 or some other fixed point, such as the exterior surface 28 below the bottom 38 of the adjustable headrest 32. The distance 60 between the bottom 38 of the adjustable headrest 32 and the seat frame 30 (or the exterior surface 28 of the seatback 22) is smaller when the adjustable headrest 32 is in the lowered position 56 than the distance 60 between the bottom 38 of the adjustable headrest 32 and the seat frame 30 (or the exterior surface 28 of the seatback 22) when the adjustable headrest 32 is in the raised position 58. In general, the adjustable headrest 32 supports the head of the occupant of the first seating assembly 16, with the positioning of the adjustable headrest 32 between the lowered position 56 and the raised position 58 depending upon the height of the occupant.

The seatbelt web guide 26 also has a lowered position 62 (see FIG. 2) and a raised position 64 (see FIG. 3), and can be adjusted from, between, and to the lowered position 62 and the raised position 64. The lowered position 62 and the raised position 64 are relative to a fixed point of the seatback 22, such as the exterior surface 28 of the seatback 22 most adjacent (such as directly below) the seatbelt web guide 26 or a support bracket 76 (discussed below) supporting the seatbelt web guide 26. For example, the distance 66 between the seatbelt web guide 26 and the support bracket 76 of the seatback 22 when the seatbelt web guide 26 is in the lowered position 62 is smaller than the distance 66 between the seatbelt web guide 26 and the support bracket 76 of the seatback 22 when the seatbelt web guide 26 is in the raised position 64. In the lowered position 62, the seatbelt web guide 26 may abut the exterior surface 28 of the seatback 22.

The seatbelt web guide 26 is connected to the adjustable headrest 32 beneath the exterior surface 28 of the seatback 22. In this embodiment, the seatbelt web guide 26 is operably connected to the first support element 44 of the adjustable headrest 32 beneath the exterior surface 28 of the seatback 22. More specifically, the seatbelt web guide 26 includes a contact portion 68, which is the portion of the seatbelt web guide 26 that contacts and guides the seatbelt webbing 24 above the exterior surface 28 of the seatback 22, and an extended portion 70 extending beneath the exterior surface 28 from the contact portion 68. The contact portion 68 is disposed above the exterior surface 28 of the seatback 22. The extended portion 70 is at least partially disposed beneath the exterior surface 28, such as an end 72 thereof. The extended portion 70 is operably connected to the first support element 44, beneath the exterior surface 28, in this embodiment, through a connector bracket 74. The connector bracket 74 is attached to the end portion 48 of the first support element 44 and also attached to the end 72 of the extended portion 70 of the seatbelt web guide 26. The connector bracket 74 can be a metal or rigid plastic component shaped to accommodate the shape/contour of the seat frame 30 of the seatback 22. The connector bracket 74 is disposed beneath the exterior surface 28 of the seatback 22. Because the adjustable headrest 32 and the seatbelt web guide 26 are operably connected via the connector bracket 74, moving the adjustable headrest 32 from the lowered position 56 to the raised position 58 causes the seatbelt web guide 26 also to move from the lowered position 62 to the raised position 64. The seatback 22 further includes the support bracket 76, mentioned above, to support the seatbelt web guide 26, attached to the seat frame 30. The support bracket 76 can take the form of a flat metal or plastic component with one end 78 attached to the seat frame 30 and another end 80 including an aperture 82. The extended portion 70 of the seatbelt web guide 26 can extend through the aperture 82. The support bracket 76 can be disposed horizontally with the extended portion 70 extending vertically through the aperture 82. The support bracket 76, to offer greater support, can be disposed closer to the seatbelt webbing 24 contact portion 68 of the seatbelt web guide 26 than to the connector bracket 74 and the end 72 of the extended portion 70 connected to the connector bracket 74.

The seatbelt webbing 24 also has a lowered position 84 (see FIG. 2) and a raised position 86 (see FIG. 3), and can be adjusted from, between, and to the lowered position 84 and the raised position 86. Because the seatbelt web guide 26 guides the seatbelt webbing 24, the position of the seatbelt web guide 26 dictates the position of the seatbelt webbing 24. Therefore, moving the adjustable headrest 32 from the lowered position 56 to the raised position 58 causes the seatbelt webbing 24 to move from the lowered position 84 to the raised position 86.

Referring now to FIGS. 5-8, the seatback 22 can optionally further include a release mechanism 88 that allows the adjustable headrest 32 to be adjusted between the lowered position 56 and the raised position 58 without consequently moving the seatbelt web guide 26 (and thus the seatbelt webbing 24) from the lowered positions 62, 84 to the raised positions 64, 86, respectively. The release mechanism 88 transforms the operable connection between the connector bracket 74 and the first support element 44 of the adjustable headrest 32 into a selectably releasable connection. A connector bracket 74A utilized with the release mechanism 88 is modified from the connector bracket 74 described above. For example, the connector bracket 74A includes a lip 90 configured to releasably receive a first arm 92 of a rotational spring 94, discussed further below. When the lip 90 has received the first arm 92, the connector bracket 74A is operably interconnected with the first support element 44 and thus moves as the adjustable headrest 32 moves. When the lip 90 is not receiving the first arm 92, the connector bracket 74A is not interconnected with the first support element 44 and thus remains stationary while the adjustable headrest 32 moves.

The release mechanism 88 includes a manipulable latch portion 96. The manipulable latch portion 96 is disposed above the exterior surface 28 of the seatback 22 and is available for an occupant of the seating assembly 16 to manipulate. The release mechanism 88 further includes a connector 98. The connector 98, at one end 100, is connected to the manipulable latch portion 96. A middle portion 102 of the connector 98 extends from the manipulable latch portion 96 to beneath the exterior surface 28.

The release mechanism 88 further includes the rotational spring 94, mentioned above. The rotational spring 94 has a base 104 that is rotatably attached to the first support element 44 of the adjustable headrest 32. The base 104 can be rotatable attached to or near the end portion 48 of the first support element 44. The rotational spring 94 further includes the first arm 92, introduced above, that extends from the base 104 and a second arm 106 that extends from the base 104. The first arm 92 and the second arm 106 can extend from the base 104 in opposite directions. The first arm 92 and the second 106 arm can be curved. The connector 98 further includes another end 108, disposed at the opposite end of the connector 98 as the one end 100. The second arm 106 is connected to the other end 108 of the connector 98. Thus, movement of the connector 98 causes the second arm 106 to move, rotating the base 104 of the rotational spring 94 and therefore the first arm 92.

Figure 6:
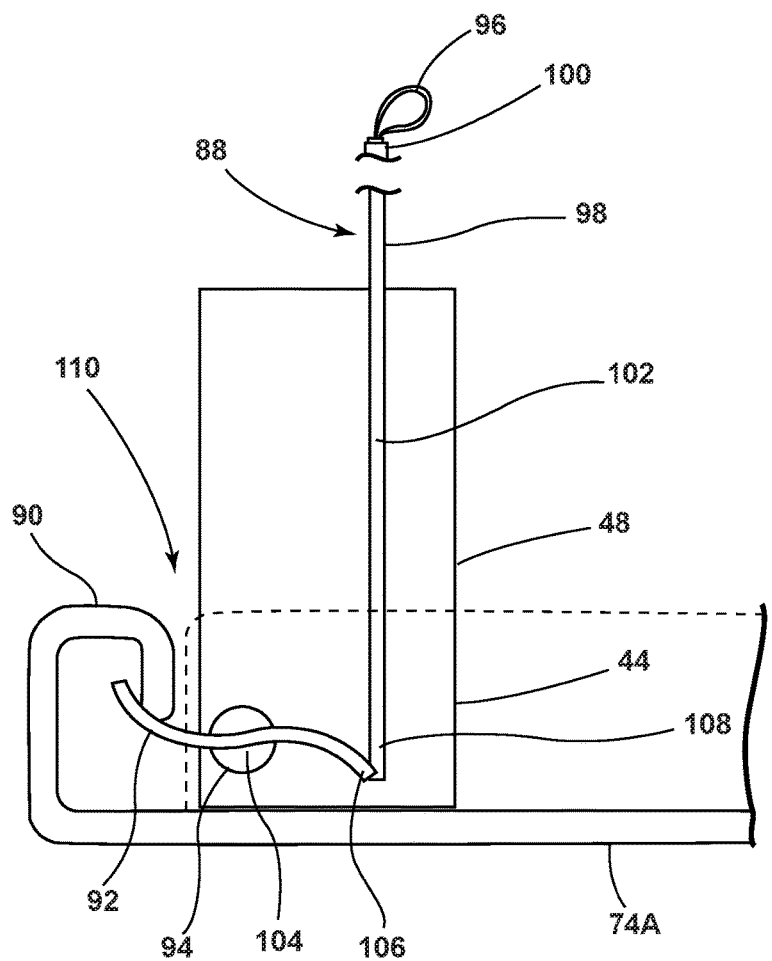
FIG. 6 is a front view of the release mechanism of FIG. 5, illustrating a manipulable latch portion connected to a second arm of a rotational spring rotatably coupled to a first support element of the adjustable headrest and a first arm of the rotational spring operably connected to the connector bracket, placing the release mechanism in a connected state.

The release mechanism 88 has a connected state 110 (see FIG. 6). In the connected state 110, the release mechanism 88 operably connects the first support element 44 to the connector bracket 74A. More specifically, the lip 90 of the connector bracket 74A has received the first arm 92 such that a force moving the first arm 92 upward also imparts a force on the lip 90 to cause the connector bracket 74A to move upward. The curvature of the first arm 92 can form a better operable connection with the lip 90 than the first arm 92 without such curvature.

Figure 7:
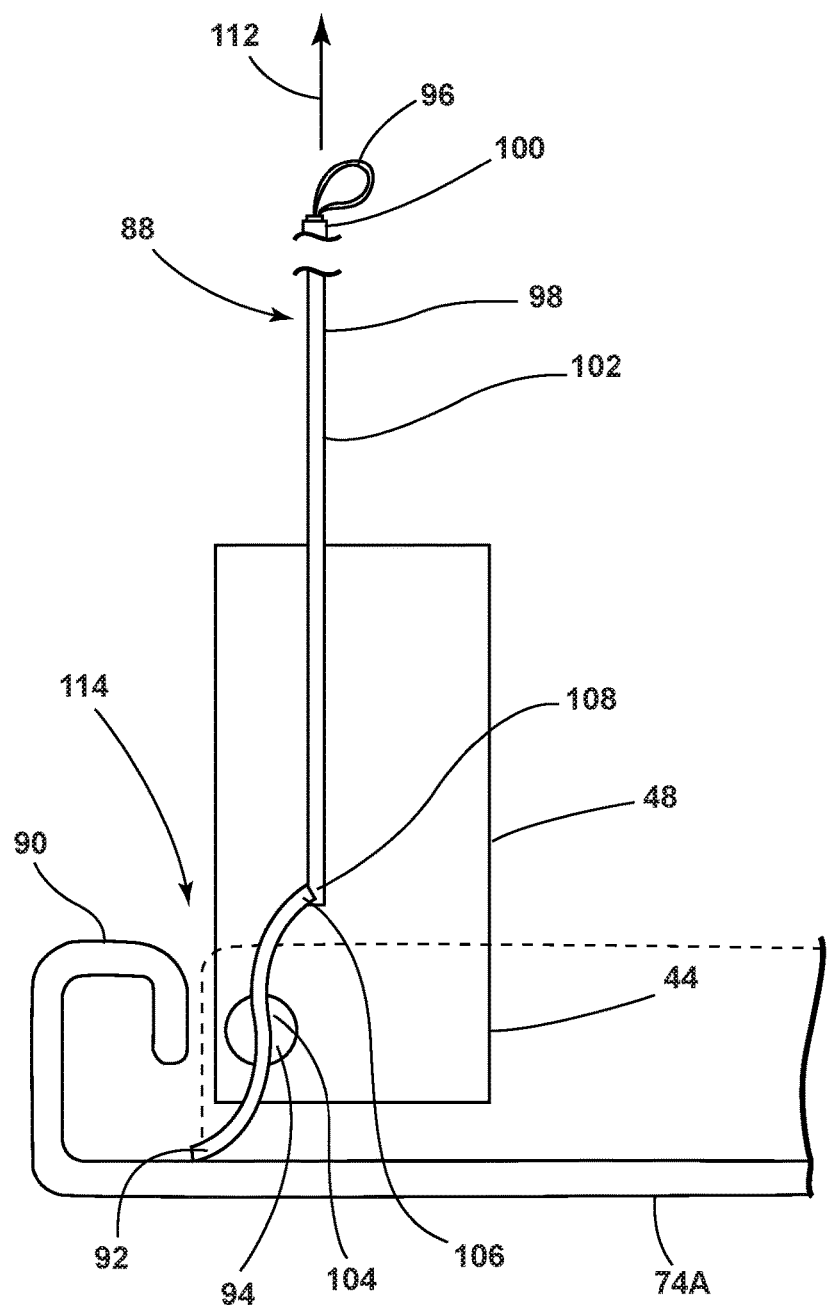
FIG. 7 is a front view of the release mechanism of FIG. 5, illustrating a force moving the manipulable latch portion upward, rotating the second arm of the rotational spring upward, and the first arm of the rotational spring downward—releasing the operable connection between the first arm and the connector bracket, placing the release mechanism in a released state.

The release mechanism 88 has a released state 114 (see FIG. 7). In the released state 114, the release mechanism 88 does not operably connect the first support element 44 to the connector bracket 74A. More specifically, the lip 90 of the connector bracket 74A is not receiving (not abutting) the first arm 92. Therefore, a force moving the first support element 44 upward will not impart a force on the lip 90 to cause the connector bracket 74A also to move upward, because the first arm 92 is not abutting the lip 90 in this released state 114. The force will cause the first support element 44 to rise and thus move the adjustable headrest 32 toward the raised position 58, while the connector bracket 74A remains stationary, rendering the seatbelt web guide 26 also stationary in the lowered position 62.

The manipulable latch portion 96 permits an occupant of the first seating assembly 16 to manipulate the release mechanism 88 to be in either the connected state 110 or the released state 114. For example, in this embodiment, the release mechanism 88 could be in the connected state 110 (as in FIG. 6). An occupant of the first seating assembly 16 lifts upward on the manipulable latch portion 96 disposed above the exterior surface 28 of the seatback 22 causing upward force 112. The upward force 112 forces the connector 98 upward as well. The upward movement of the connector 98 pulls upward on the second arm 106 of the rotational spring 94, which causes the base 104 to rotate and the first arm 92 to move downward and no longer to be operably connected (abutting) the lip 90 of the connector bracket 74A. The release mechanism 88 has thus been manipulated to the released state 114 (as in FIG. 7). The occupant can then move the adjustable headrest 32 from the lowered position 56 to the raised position 58 without causing the seatbelt web guide 26 and the guided seatbelt webbing 24 to move from the lowered positions 62, 84 to the raised positions 64, 86, respectively (as in FIG. 8).

Figure 8:
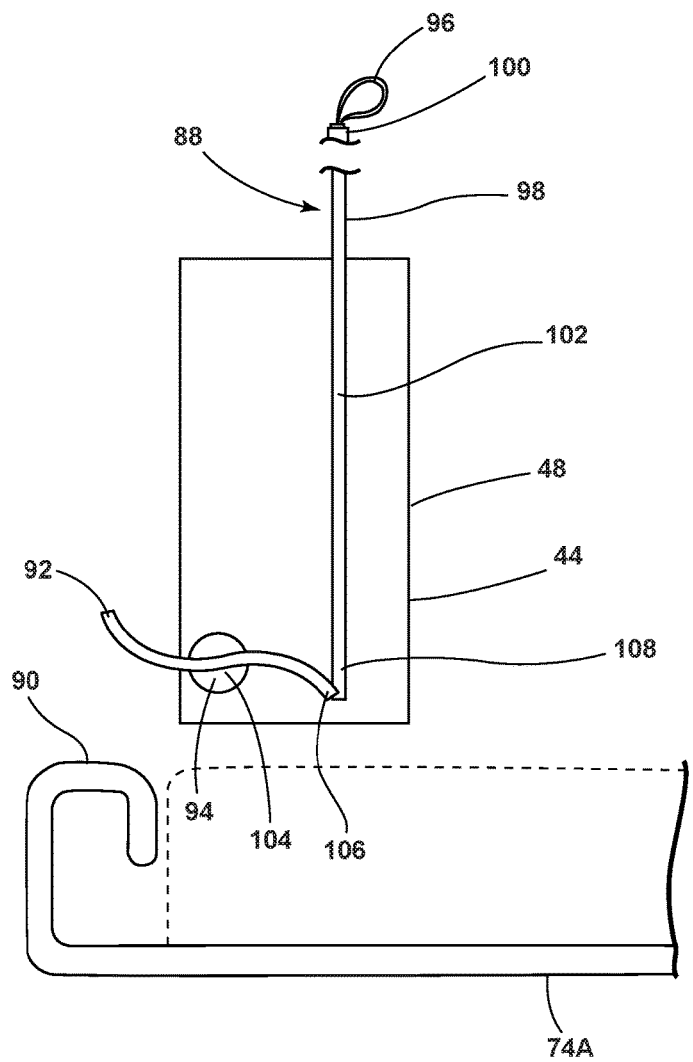
FIG. 8 is a front view of the release mechanism of FIG. 5, illustrating the adjustable headrest raised toward the raised position independently of the connector bracket, connected to the seatbelt web guide, which remains in the lowered position.

The rotational spring 94 is spring-biased to cause the first arm 92 of the rotational spring 94 to be in a position where the first arm 92 can form an operable connection with the connector bracket 74A, if the occupant of the first seating assembly 16 is not using the manipulable latch portion 96 to impart the upward force 112 causing the release mechanism 88 to be in the released state 114 (as in FIG. 8). That is, if the adjustable headrest 32 is in the lowered position 56 and the operator releases the manipulable latch portion 96, then the spring bias property of the rotational spring 94 causes the first arm 92 to become operably connected with the connector bracket 74A (as in FIG. 6). Further, if the adjustable headrest 32 is in the raised position 58 and the seatbelt web guide 26 is in the lowered position 62 (as in FIG. 8), and if the occupant is not using the manipulable latch portion 96 to manipulate the release mechanism 88 to the released state 114, then moving the adjustable headrest 32 to the lowered position 56 causes the first arm 92 to operably connect the connector bracket 74A. The first arm 92 can slide over the lip 90 of the connector bracket 74A, as the adjustable headrest 32 is moved to the lowered position 56. The release mechanism 88 is then back in the connected state 110 (as in FIG. 6). Subsequently moving the adjustable headrest 32 to the raised position 58 from the lowered position 56 again causes the seatbelt web guide 26 and seatbelt webbing 24 to move to the raised positions 64, 86, respectively, as well. The seatbelt web guide 26 is now adjustable to accommodate larger occupants of the first seating assembly 16, which may increase usage of the seatbelt webbing 24.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seatback for a seating assembly of a vehicle comprising:
   a seat frame;
   an exterior surface at least partially covering the seat frame;
   an adjustable headrest operably connected to the seat frame having a raised position and a lowered position relative to the seat frame, and including a support element operably connecting the adjustable headrest to the seat frame, the support element at least partially disposed beneath the exterior surface;
   a seatbelt web guide having a raised position and a lowered position relative to a portion of the exterior surface that is positioned adjacent the seatbelt web guide, and including a seatbelt webbing contact portion disposed above the exterior surface and an extended portion extending from the seatbelt webbing contact portion, the extended portion being at least partially disposed beneath the exterior surface;
   a connector bracket attached to the extended portion of the seatbelt web guide and extending towards the support element of the adjustable headrest beneath the exterior surface;
   a release mechanism releasably connecting the connector bracket to the support element of the adjustable headrest, the release mechanism having a connected state, wherein the release mechanism operably connects the support element to the connector bracket, and a released state, wherein the support element is not operably connected to the connector bracket;
   the release mechanism including a manipulable latch portion disposed above the exterior surface allowing an occupant of the seating assembly to manipulate the release mechanism to be in either the connected state or the released state; and
   wherein, moving the adjustable headrest from the lowered position to the raised position causes the seatbelt web guide to move from the lowered position to the raised position, when the release mechanism is in the connected state but not when the release mechanism is in the released state.

2. The seatback of claim 1 further comprising:
   a support bracket attached to the seat frame, the support bracket supporting the seatbelt web guide;
   wherein, the support bracket is disposed closer to the seat belt webbing contact portion than the connector bracket.

3. The seatback of claim 1,
   the release mechanism further comprising:
      a connector connected to the manipulable latch portion, the connector at least partially disposed beneath the exterior surface;
      a rotational spring including a base attached to the support element of the adjustable headrest, a first arm extending from the base, and a second arm extending from the base and operably connected with the connector;
      wherein, using the manipulable latch portion to manipulate the release mechanism to the released state causes the first arm of the rotational spring not to be operably connected to the connector bracket and moving the adjustable headrest from the lowered position to the raised position does not cause the seatbelt web guide to move from the lowered position to the raised position.

4. The seatback of claim 3,
   wherein, the rotational spring is spring-biased to cause the first arm of the rotational spring to be operably connected with the connector bracket if the adjustable headrest is in the lowered position and the manipulable latch portion is not causing the release mechanism to be in the released state.

5. The seatback of claim 3,
   wherein, if the adjustable headrest is in the raised position and the seatbelt web guide is in the lowered position, and if the manipulable latch portion is not manipulating the release mechanism to the released state, then moving the adjustable headrest from the raised position to the lowered position causes the first arm to operably connect to the connector bracket.

6. The seatback of claim 5,
   wherein, subsequently moving the adjustable headrest to the raised position from the lowered position causes the seatbelt web guide also to move to the raised position.

7. A vehicle comprising:
   a seatbelt webbing; and
   a seating assembly including a seatback comprising:
      a seat frame;
      an exterior surface at least partially covering the seat frame;
      an adjustable headrest operably connected to the seat frame having a raised position and a lowered position relative to the seat frame, and including a support element operably connecting the adjustable headrest to the seat frame, the support element at least partially disposed beneath the exterior surface;
      a seatbelt web guide guiding the seatbelt webbing above the exterior surface, the seatbelt web guide having a raised position and a lowered position relative to a portion of the exterior surface that is positioned adjacent the seatbelt web guide, and including a seatbelt webbing contact portion disposed above the exterior surface and an extended portion extending from the seatbelt webbing contact portion, the extended portion being at least partially disposed beneath the exterior surface;
      a connector bracket attached to the extended portion of the seatbelt web guide and extending towards the support element of the adjustable headrest beneath the exterior surface;
      a release mechanism releasably connecting the connector bracket to the support element of the adjustable headrest, the release mechanism having a connected state, wherein the release mechanism operably connects the support element to the connector bracket, and a released state, wherein the support element is not operably connected to the connector bracket; and
      the release mechanism including a manipulable latch portion disposed above the exterior surface allowing an occupant of the vehicle to manipulate the release mechanism to be in either the connected state or the released state;
      wherein, moving the adjustable headrest from the lowered position to the raised position causes the seatbelt web guide to move from the lowered position to the raised position, when the release mechanism is in the connected state but not when the release mechanism is in the released state; and
      wherein, moving the adjustable headrest from the lowered position to the raised position causes the seatbelt webbing to move from a lowered position to a raised position, when the release mechanism is in the connected state but not when the release mechanism is in the released state.

8. The vehicle of claim 7 further comprising:
a support bracket attached to the seat frame, the support bracket supporting the seatbelt web guide;
wherein, the support bracket is disposed closer to the seatbelt webbing contact portion than to the connector bracket.

9. The vehicle of claim 7,
the release mechanism further comprising:
   a connector connected to the manipulable latch portion, the connector at least partially disposed beneath the exterior surface; and
   a rotational spring including a base attached to the support element of the adjustable headrest, a first arm extending from the base, and a second arm extending from the base and operably connected with the connector;
wherein, using the manipulable latch portion to manipulate the release mechanism to the released state causes the first arm of the rotational spring not to be operably connected to the connector bracket and moving the adjustable headrest from the lowered position to the raised position does not cause the seatbelt web guide to move from the lowered position to the raised position or the seatbelt webbing to move from the lowered position to the raised position.

10. The vehicle of claim 9,
wherein, the rotational spring is spring-biased to cause the first arm of the rotational spring to be operably connected with the connector bracket if the adjustable headrest is in the lowered position and the manipulable latch portion is not causing the release mechanism to be in the released state.

11. The vehicle of claim 9,
wherein, if the adjustable headrest is in the raised position and the seatbelt web guide is in the lowered position, and if the manipulable latch portion is not manipulating the release mechanism to the released state, then moving the adjustable headrest from the raised position to the lowered position causes the first arm to operably connect to the connector bracket.

12. The vehicle of claim 11,
wherein, subsequently moving the adjustable headrest to the raised position from the lowered position causes the seatbelt web guide also to move to the raised position, and the seatbelt webbing also to move to the raised position.

13. A vehicle seating assembly comprising:
a seatback having an exterior surface and an adjustable headrest, the adjustable headrest having a raised position and a lowered position relative to the exterior surface of the seatback;
seatbelt webbing;
a seatbelt web guide including a contact portion disposed above the exterior surface that contacts and guides the seatbelt webbing over the exterior surface of the seatback and an extended portion extending beneath the exterior surface of the seatback, the seatbelt web guide having a raised position and a lowered position relative to the exterior surface of the seatback; and
a release mechanism comprising:
   a connected state, wherein the release mechanism operably connects the seatbelt web guide to the adjustable headrest beneath the exterior surface of the seatback such that moving the adjustable headrest from the lowered position to the raised position causes the seatbelt web guide to move from the lowered position to the raised position;
   a released state, wherein the release mechanism does not operably connect the seatbelt web guide to the adjustable headrest such that moving the adjustable headrest from the lowered position to the raised position does not cause the seatbelt web guide to move from the lowered position to the raised position; and
   a manipulable latch portion configured to permit an occupant to manipulate the release mechanism to be in either the connected state or the released state.

14. The vehicle seating assembly of claim 13,
wherein, the manipulable latch portion is available for the occupant to manipulate above the exterior surface.

15. The vehicle seating assembly of claim 14,
the release mechanism further comprising:
   a connector including one end, which is connected to the manipulable latch portion, a middle portion, which extends to beneath the exterior surface, and an other end; and
   a rotational spring including a base that is rotatably attached to the adjustable headrest, a first arm extending from the base, and a second arm extending from the base in a generally opposite direction as the first arm and connected to the other end of the connector;
wherein, when the release mechanism is in the connected state, the first arm of the rotational spring operably connects the adjustable headrest to the seatbelt web guide;
wherein, when the occupant manipulates the manipulable latch portion to cause the release mechanism to be in the released state, the manipulation of the manipulable latch portion moves the connector, which moves the second arm of the rotational spring, which causes the base of the rotational spring to rotate and thus the first arm of the rotational spring to no longer operably connect the adjustable headrest to the seatbelt web guide.

16. The vehicle seating assembly of claim 15,
wherein, the rotational spring is spring-biased to cause the first arm of the rotational spring to operably connect the adjustable headrest to the seatbelt web guide when the manipulable latch portion is not being manipulated.

17. The vehicle seating assembly of claim 16 further comprising:
a seatback; and
a connector bracket;
wherein, the adjustable headrest further comprises a bottom, a first support element, and a second support element, both the first support element and the second support element extending from the bottom of the adjustable headrest and into the seatback beneath the exterior surface;
wherein, the base of the rotational spring is attached to the first support element;
wherein, the extended portion extending beneath the exterior surface from the contact portion terminates in an end;
wherein, the connector bracket is attached to the end of the extended portion of the seatbelt web guide and extends toward the first support element of the adjustable headrest;
wherein, the connector bracket receives the first arm of the rotational spring when the release mechanism is in the connected state to operably connect the adjustable headrest and the seatbelt web guide; and wherein, the connector bracket does not receive the first arm of the rotational spring when the release mechanism is in the released state.

18. The vehicle seating assembly of claim 17, the connector bracket further including a lip that receives the first arm of the rotational spring when the release mechanism is in the connected state to operably connect the adjustable headrest and the seatbelt web guide, such that a force moving the first arm upward also imparts a force on the lip to cause the connector bracket, and thus the seatbelt web guide, to move upward.

19. The vehicle seating assembly of claim 18, wherein, when the release mechanism is in the released state, the lip of the connector bracket does not receive the first arm and the adjustable headrest and the seatbelt web guide are not operably connected, such that the connector bracket and thus the seatbelt web guide remain stationary while the adjustable headrest moves from the lowered position to the raised position.

20. The vehicle seating assembly of claim 19, wherein, when the seatbelt web guide is in the lowered position and the manipulable latch portion is not manipulating the release mechanism to the released state, moving the adjustable headrest from the raised position to the lowered position causes the first arm to slide over the lip of the connector bracket and the spring-bias of the rotational spring causes the connector bracket to receive the first arm of the rotational spring and thus place the release mechanism in the connected state.

* * * * *